United States Patent
Gray

(10) Patent No.: US 10,624,313 B1
(45) Date of Patent: Apr. 21, 2020

(54) COMPACT EXPANDABLE COUNTERTOP PET GROOMING AND WASHING STATION

(71) Applicant: Maurice Edward Gray, Miramar, FL (US)

(72) Inventor: Maurice Edward Gray, Miramar, FL (US)

( * ) Notice: Subject to any disclaimer, the term of this patent is extended or adjusted under 35 U.S.C. 154(b) by 100 days.

(21) Appl. No.: 15/927,092

(22) Filed: Mar. 21, 2018

(51) Int. Cl.
  *A01K 13/00* (2006.01)
  *A47K 3/32* (2006.01)

(52) U.S. Cl.
  CPC ............. *A01K 13/001* (2013.01); *A47K 3/32* (2013.01)

(58) Field of Classification Search
  CPC .......... A01K 3/001; A47K 3/06; A47K 3/062; A47K 3/064; A47K 3/32
  See application file for complete search history.

(56) References Cited

U.S. PATENT DOCUMENTS

| 10,143,182 B1* | 12/2018 | Ferro | A01K 13/001 |
| 2008/0190375 A1* | 8/2008 | German | A01K 13/001 119/606 |
| 2012/0037085 A1* | 2/2012 | Caisse | A01K 13/001 119/676 |
| 2012/0118244 A1* | 5/2012 | Finch | A01K 13/001 119/600 |

\* cited by examiner

*Primary Examiner* — Daniel J Colilla

(57) ABSTRACT

The Compact Expandable Countertop Pet Grooming and Washing Station (the Station) is a combination grooming platform and washing platform that is contained within a folding box and designed to be used on a typical household bathroom countertop, on top of a bathroom wash-basin, or any other flat surface near a water source and drain. The Station is contained within a rectangular box whose sides, from the closed position, open in a sequence to expose a surface for a pet to stand upon to be groomed, and further opened, creating splash panels while exposing a porous platform. The porous washing platform sits atop a sloped-floor surface that funnels water to a water spout/outlet at the back of the station. A removable drawer serves as hair capture compartment for use with the grooming platform, and as a storage compartment for the Station accessories.

3 Claims, 3 Drawing Sheets

COMPACT EXPANDABLE COUNTERTOP PET GROOMING AND WASHING STATION

CROSS-REFERENCE TO RELATED APPLICATIONS

62/601,380

STATEMENT REGARDING FEDERALLY SPONSORED RESEARCH OR DEVELOPMENT

N/A

REFERENCE TO SEQUENCE LISTING, A TABLE, OR A COMPUTER PROGRAM LISTING COMPACT DISC APPENDIX

N/A

BACKGROUND OF INVENTION

This invention relates to an animal grooming and washing station, and particularly, to an animal grooming and washing station that is designed to be used on a countertop near a water source, and drain, allowing the user to stand, or sit at a countertop during the grooming and washing process.

There are approximately 73 million households in the United States with pets, while there are approximately 45 million of those households that own dogs[1]. Dogs essentially become a member of the family and spend a great deal of time near the entire family, throughout our homes; and we want them to be clean. Although pet owners may occasionally elect to use a professional groomer to groom and wash their pets, the need usually arises to groom, or wash the dog at home. Unfortunately, most homes and apartments do not present easy ways to groom and wash even a relatively small dog. A dog can be placed on most flat surfaces for grooming but controlling and collecting the cut hair can be a problem. Washing the dog is a greater challenge because there are no ideal wash locations within the home, and owners must resort to sinks, a bathtub, or a "joint" shower to wash their dogs. Bathroom sinks are relatively small, even for dogs less than 10 pounds, and based on the myriad things that prompt a dog washing, the kitchen sink is a less than desirable choice. Additionally, dogs are not usually eager to get wet, so the fight to keep them in the sink; or the chase around the bathtub, begins. The bathtub offers a relatively better amount of space, and access to water needed for home bathing, but it puts physical stress onto the pet owner who must kneel at the side of the bathtub, while using both hands to hold and wash the pet. Being on your knees, while arching over the bathtub for a prolonged period, is uncomfortable, and in some cases impossible for individuals with physical limitations. Unfortunately, the current difficulty of home pet bathing can serve to reduce bathing frequency, allowing for dirt and/or parasites to persist on your dog, and in the home.

[1] https://www.iii.org/fact-statstic/facts-statistics-pet-statistics

BRIEF SUMMARY OF INVENTION

The present invention concerns an animal grooming and washing station consisting of a rectangular box, whose interior can be used as a grooming platform, and further, as a washing station that is designed to be used on the average home countertop near a water source and drain. This invention provides a portable, stable platform for pet grooming and washing within the home, a method for capturing and funneling wastewater away from the pet, and a more comfortable physical position for pet owners during the grooming and washing process. The top of the box can be closed with the sequenced closing of three hinged panels connected at the top of the rectangular box. From the closed position, the top-most panel (the Back), can be lifted to expose the two-overlapping opposing lateral panels (the Sides) which serve as the grooming platform where the pet can be positioned for hair trimming. Hair trimmings can be pulled towards the front of grooming platform, and into an open drawer, which when closed, creates the front wall of the box, and when emptied serves as storage for the rinsing and drainage hoses. For washing, the closed lateral panels can be lifted to form elevated side-walls, while exposing a grate, where the pet can be positioned for washing, allowing for wastewater to pass through onto a sloping floor that drains downward towards the rear of the box and out through a drainage hose that can be directed into a nearby sink drain. After washing the lateral and back panels can be closed sequentially, and the respective hoses used for rinsing and draining can be stored away in the emptied/cleaned hair-capture drawer.

DETAILED DESCRIPTION OF THE INVENTION

Figure 1:
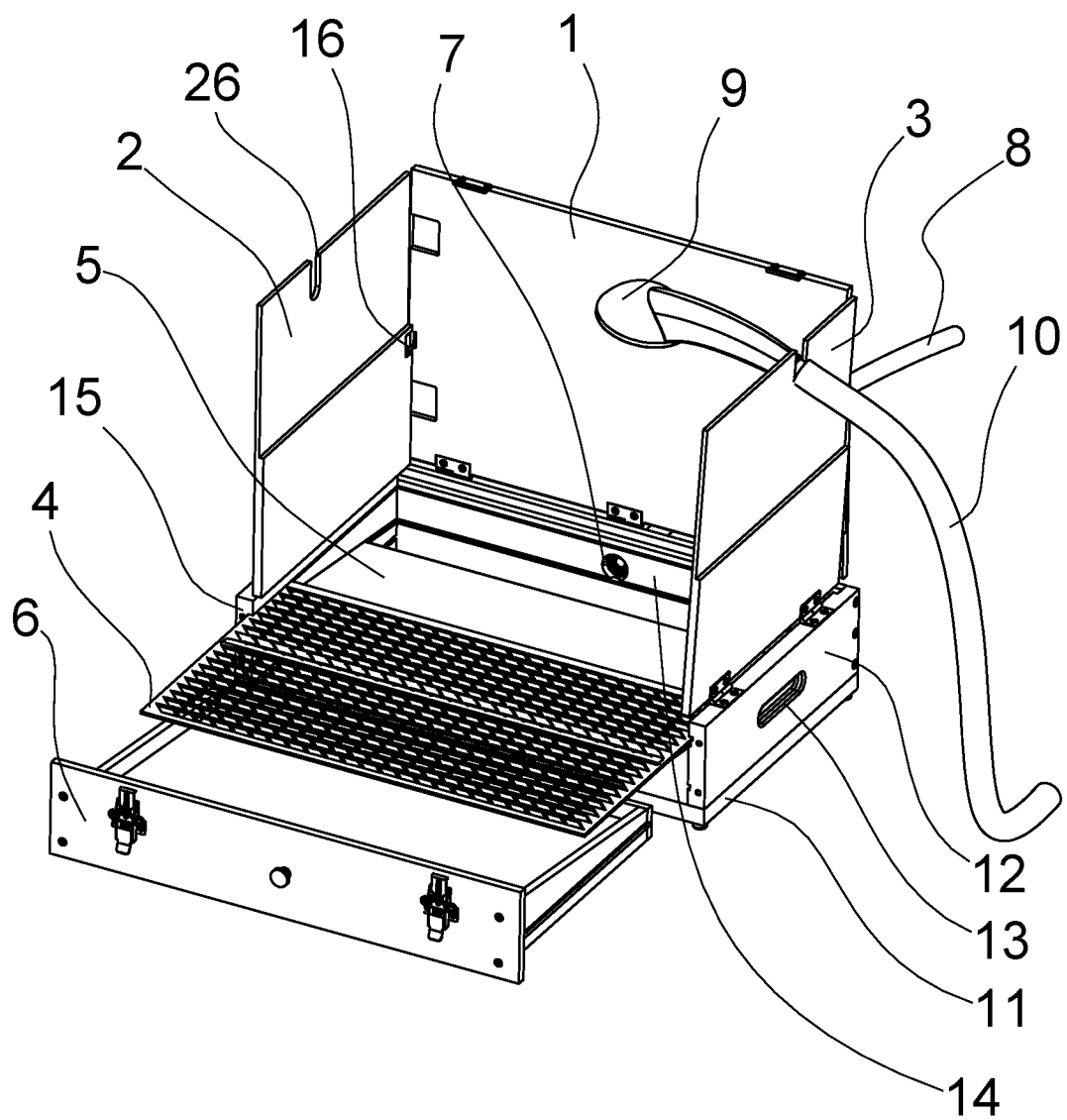
FIG. 1 is a perspective view showing a preferred embodiment of the invention.
Figure 2:
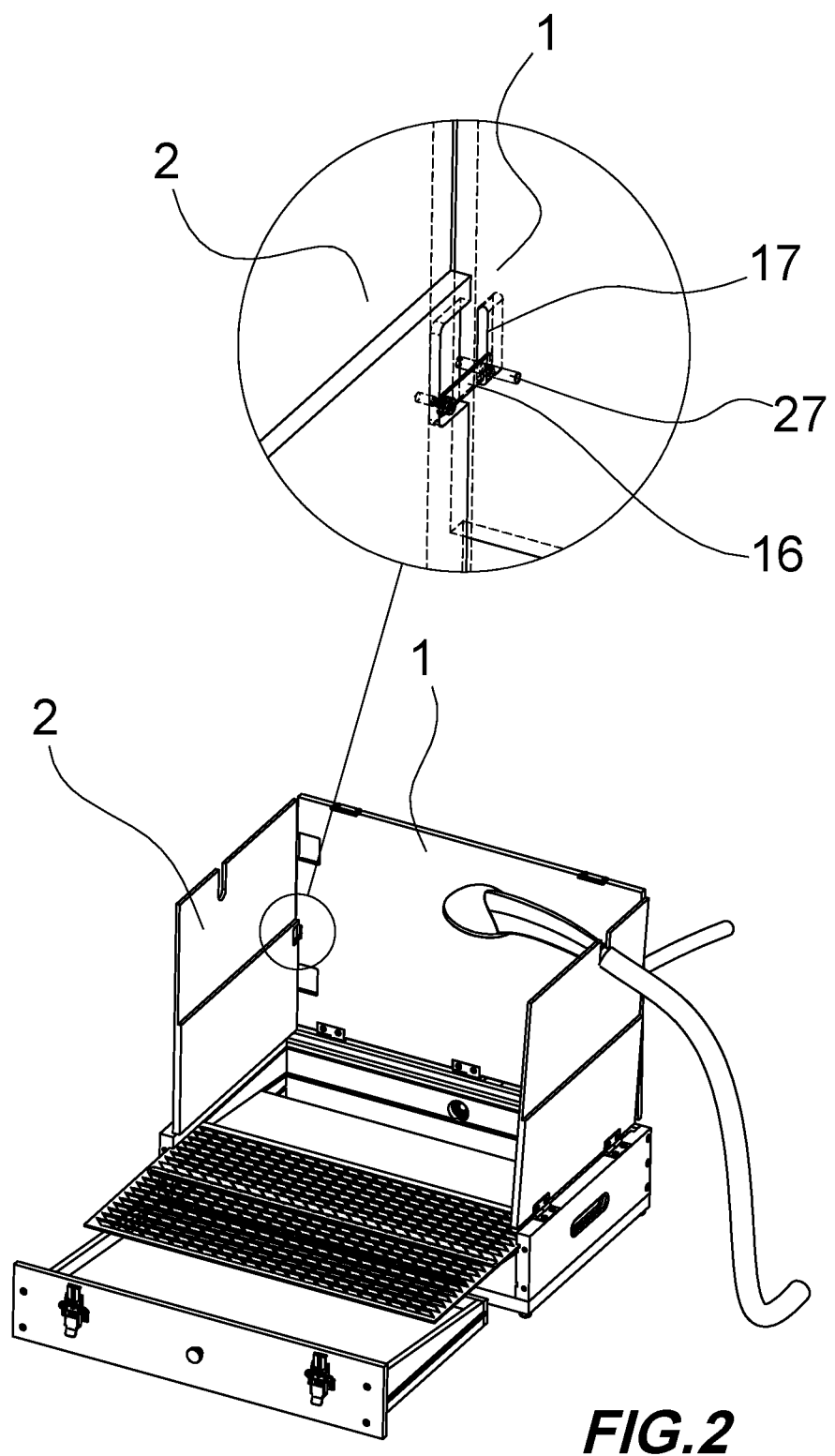
FIG. 2 is an expanded isolated view showing the hooking mechanism serving to connect the adjacent back and side panels of the embodiment in FIG. 1.

The animal grooming and washing station shown in FIG. 1 is essentially a rectangular box or prism that can be closed and opened to expose a pet grooming platform and washing station. The said rectangular box is formed with a horizontal base 11 that has a length greater than its width. The walls of the box are formed by rectangular sidewalls 12, 15, and a rectangular backwall 14 which are connected perpendicularly to the base 11. The box walls 12, 15, and 14 have adjoining splash-panels 3, 2, and 1, respectively, which are all connected with several conventional hinges 23, 24 to the wall tops, shown in FIG. 4. When the splash-panels 3, 2, and 1 are in an upright position, as shown in FIG. 1, the side splash-panels 3, 2 will be connected to the back splash-panel 1 forming a 90-degree angle and secured with a hooking latch attached to side panels 2, 3 that will connect with a pin 27 through cutouts 17 in the back panel 1, as shown in FIG. 2.

When the box is fully open, as shown in FIG. 1, the porous washing platform 4, upon which a small animal may be placed for washing, is exposed. The porous washing platform 4, shall be supported by grooves in the box walls 12, 15, and 14. In operation, a conventional shower-head 9, which rests in a slot 26 cut into the tops of the side splash-panels 3, 2, and connects to a hose 10 that will provide water from a nearby water source, like a faucet near a countertop. The water produced in the washing process will flow through the porous washing platform 4, onto a sloped floor 5, which will be supported by angled slots cut into the sidewalls 12, 15, and further by a slot cut into the backwall 14. The sloped floor 5 slopes downward from the upper front of the box, being buttressed by the front/drawer panel 6, to the rear of the box, intersecting with the lower third of the back wall 14. The sloped-floor 5 direct washwater runoff towards a drain hole 7, which is positioned above the intersection of the sloped-floor 5 and the back wall 14. The drain hole 7 will release water through the rear of backwall 14 through a hose 8 whose terminal end, opposite the box, can be posited into a nearby sink, or other water drainage pipe. The hose 8 will connect to the outside of the backwall 14 using a conventional hose coupling.

Figure 4:
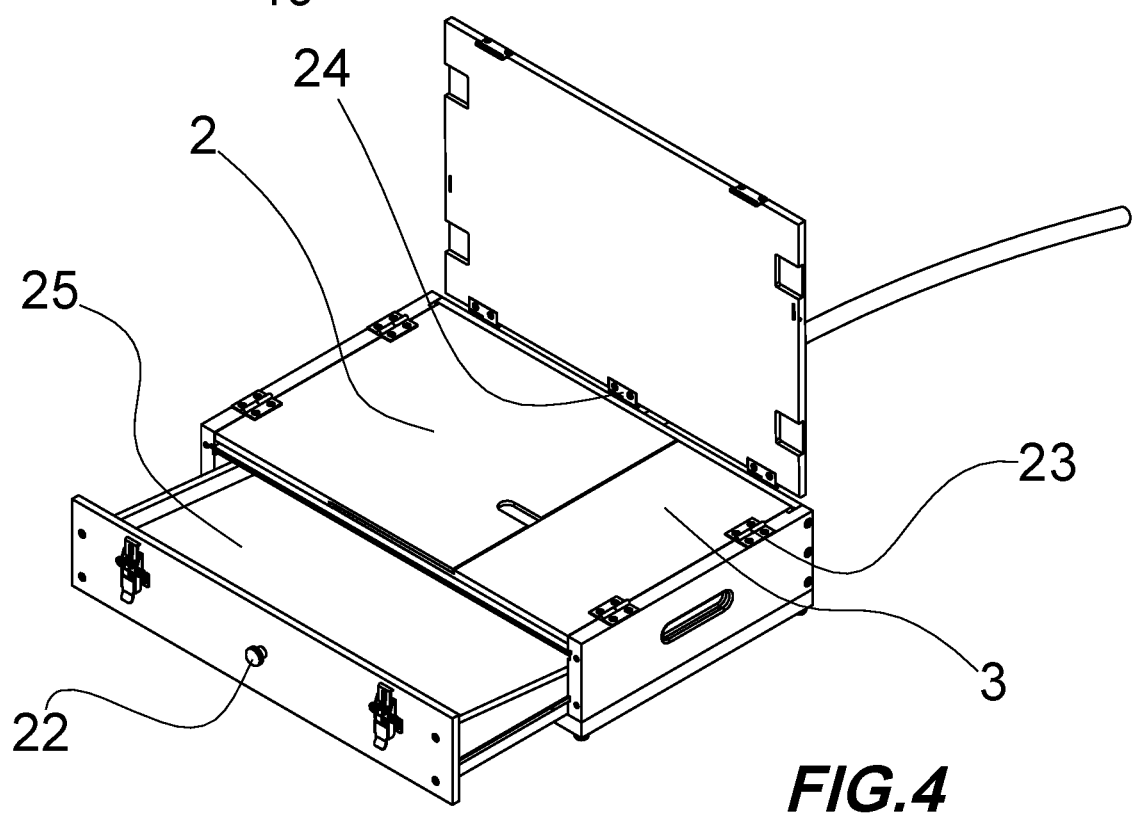
FIG. 4 is a perspective view showing the embodiment in FIG. 1 in its grooming station configuration with its back in a vertical position and side splash-panels in their horizontal overlapping position.

FIG. 4 illustrates the box when it is used for grooming, with the back splash-panel 1 in its up position and the side splash-panels 2, 3 are folded down, to form the grooming platform, and a small pet can be placed thereon. The back splash-panel 1 shall be supported in its upright position with conventional spring hinging 24. Hair-trimmings generated during grooming that fall onto the grooming platform, can be brushed into the interior of the drawer 25 at the front of the box. A knob 22 is affixed to the front of the drawer to facilitate movement in and out of the box in its position beneath the sloping floor 5. When the grooming/washing station is not in use, the accessory hoses 8, 10, and the shower-head 9 can be stored within the drawer 25.

Figure 3:
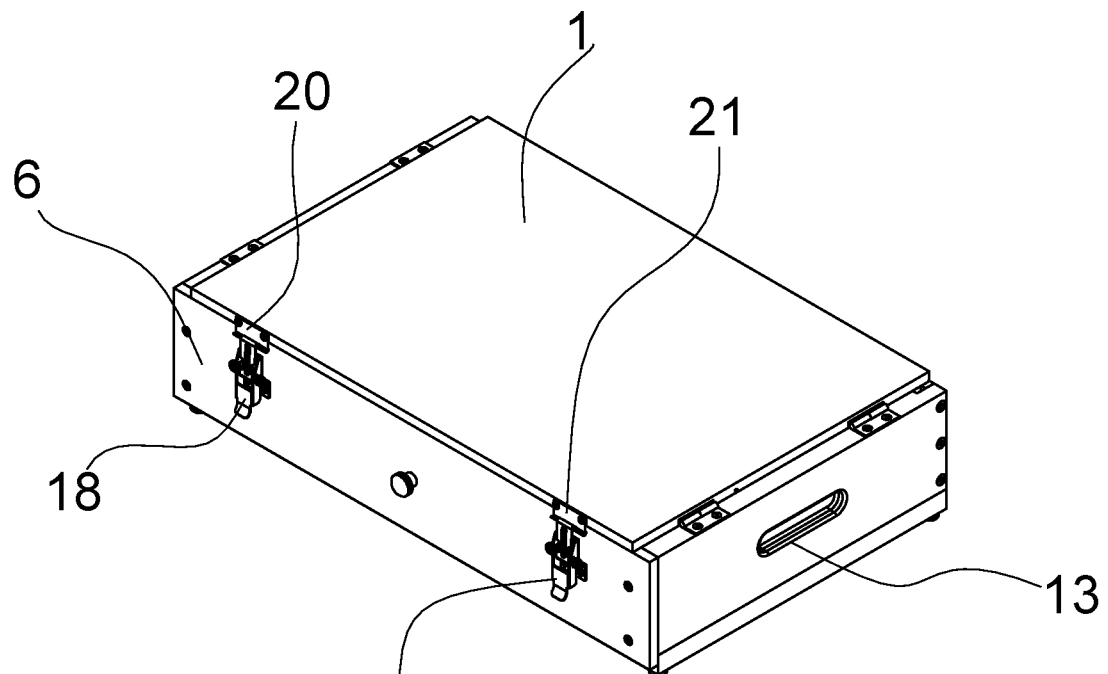
FIG. 3 is a perspective view showing the embodiment in FIG. 1 in its closed position with its back and side panels in their horizontal position.

Following use, the box can be closed completely by sequentially lowering the side splash-panels 3, 2, as shown in FIG. 4, then the back splash-panel 1, as illustrated in FIG. 3. The box can be secured in the closed position with a conventional toggle latches, while the latch body 18, 19 will be affixed to front of the drawer 6, with corresponding latch hooks 20, 21 affixed to the adjacent edge of the closed back splash-panel 1. Once closed, the grooming/washing station can be carried using fingerholes 13 which will be cut into side-wall panels 12, 15.

The manufacture of the main embodiment shall consist of hard plastics to accommodate the flow of water through the box, while also providing the strength to support the weight of the animals to be groomed or washed. While the foregoing description has been with reference to the preferred embodiment of the invention, it is to be noted that variations and modifications may be made therein without departing from the scope of the invention.

What is claimed is:

1. An animal grooming and washing station which comprises:
    a) a box, prism, or other three-dimensional geometric shape, generically referred to herein as the "box" is configured to be closed or opened;
    b) a grooming platform within said box, formed by horizontal, overlapping side-panels (2, 3) of said box, on which an animal can be placed;
    c) a porous washing platform (4) within said box, beneath said grooming platform, on which an animal can be placed for washing;
    d) a sloped under-flooring (5) beneath said porous washing platform (4) within said box;
    e) a drain hole (7) in a backwall (14) of said box, above an intersection of said sloped under-flooring (5) and the backwall of said box; and
    f) a drawer (6) within said box, beneath said sloped under-flooring (5).

2. The animal grooming and washing station of claim 1 wherein said box includes:
    a) movable, overlapping top flaps (2, 3) that are either hinged to the top of the walls of said box, or are untethered from said box; and
    b) movable, overlapping top flaps (1,2,3) that are each configured to be raised from a closed, horizontal-position, to a stationary, open vertical-position.

3. The animal grooming and washing station of claim 1 wherein said sloped under-flooring (5) is positioned to slope downward towards the rear of said box.

* * * * *